INVENTOR.
BERT W. KING
BY
ATTORNEY.

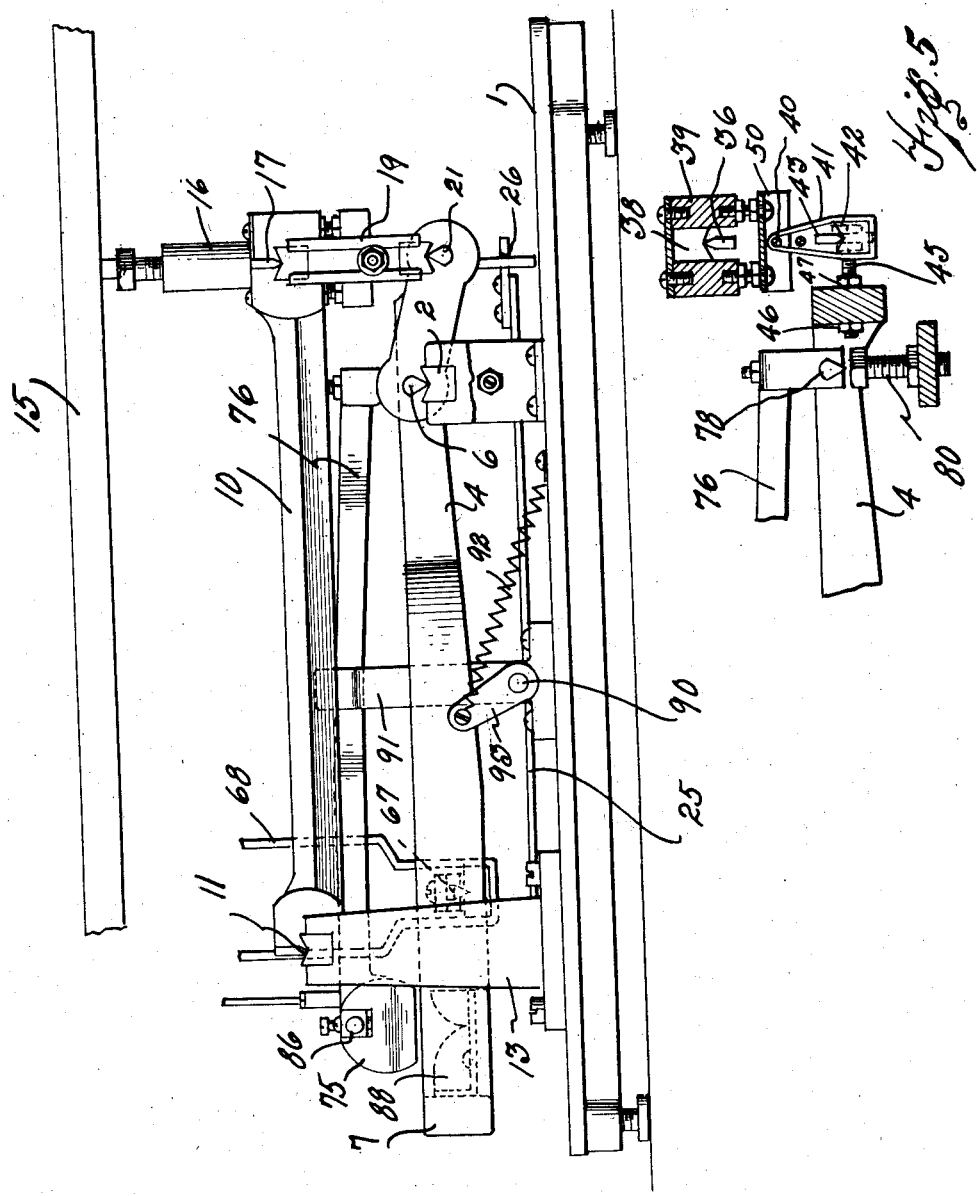

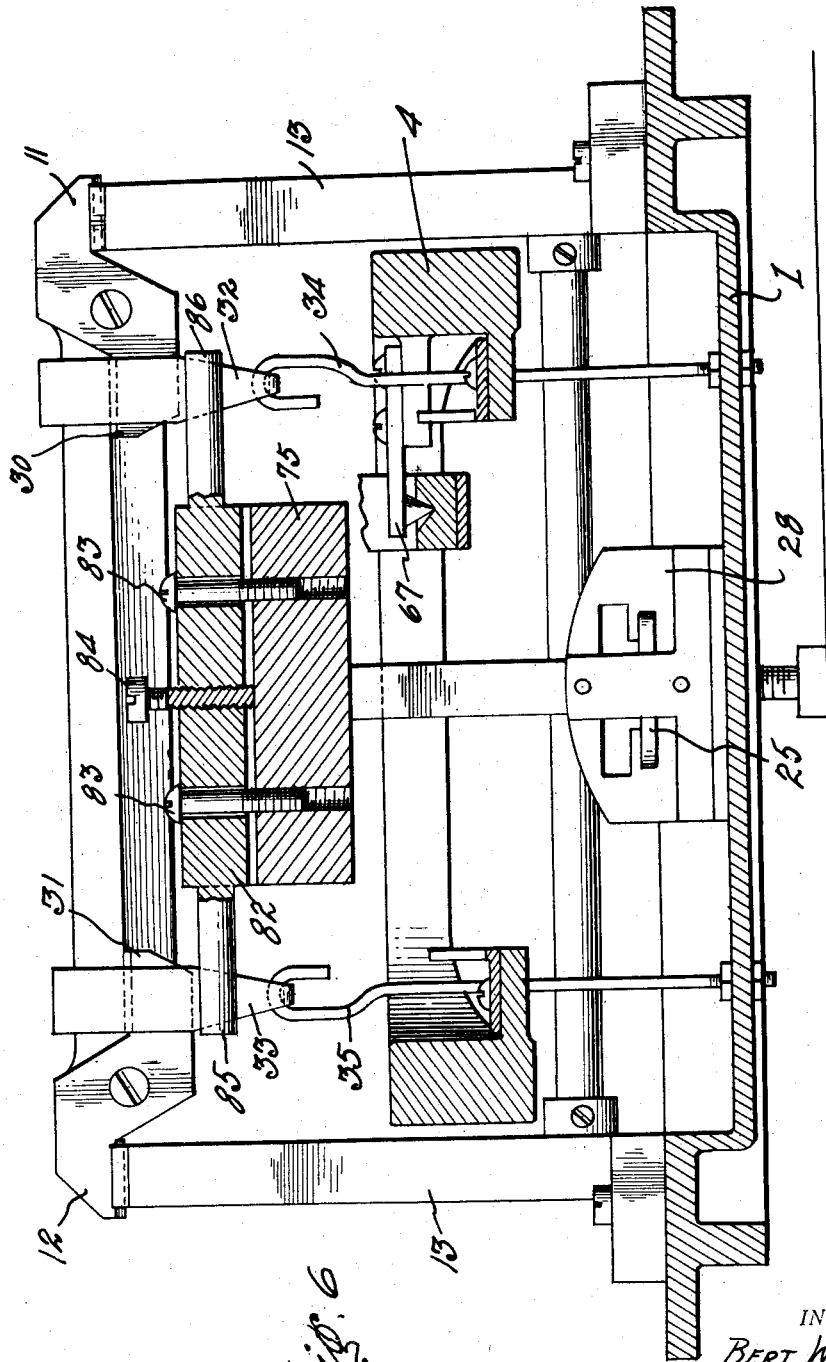

June 23, 1931.   B. W. KING   1,811,831
SCALE
Filed Sept. 21, 1927   5 Sheets-Sheet 5
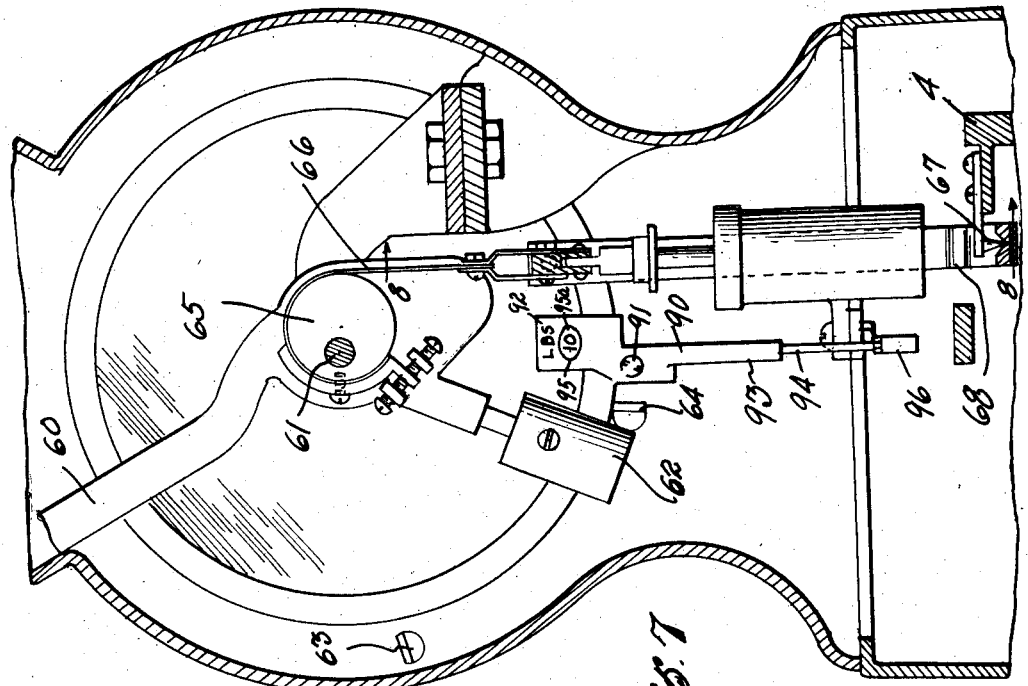
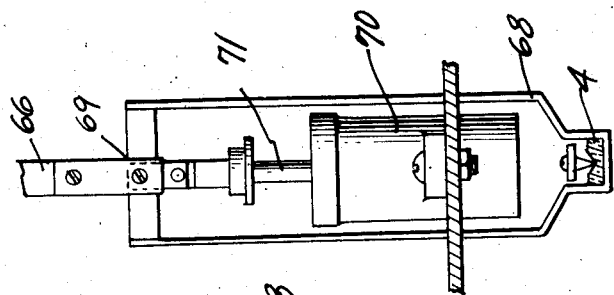
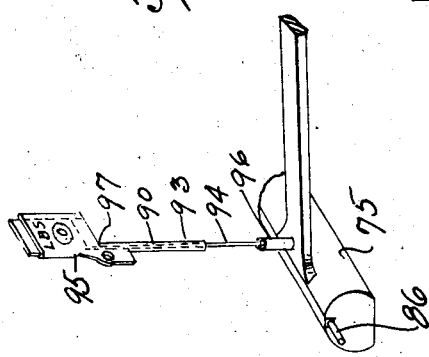
INVENTOR.
BERT W. KING
BY
ATTORNEY.

Patented June 23, 1931

1,811,831

UNITED STATES PATENT OFFICE

BERT W. KING, OF DETROIT, MICHIGAN, ASSIGNOR TO BARNES SCALE COMPANY, OF DETROIT, MICHIGAN, A CORPORATION OF MICHIGAN

SCALE

Application filed September 21, 1927. Serial No. 220,899.

This invention relates to scales, and has to do especially with a lever system and other parts and mechanism associated with the lever system, including an operable connection between such lever system and an indicator mechanism.

One of the features of the invention is a provision for extra capacity wherein added counter balancing weight may be used as elected, and the invention contemplates the arrangement wherein some of the bearings which are sometimes inoperable and sometimes operable, depending upon whether or not the extra capacity weight is used or not, automatically find their own bearings which are in proper position with relation to other bearings. The invention also contemplates a construction wherein these bearings having the extra capacity weight may be quickly and easily adjusted with respect to each other so that weight is carried equally by the bearings. Another further feature of the invention is a novel construction of the extra capacity weight wherein the center of gravity can be quickly and easily changed and adjusted.

The invention also contemplates a connection between the lever system and an indicator mechanism of the type which utilizes a pendulum operated by a ribbon operating over an eccentric. The arrangement is such as to prevent buckling of a ribbon, thus destroying the accuracy of the scale when too great a load is suddenly placed on the scale platform. This is especially desirable in an over capacity scale wherein a heavy load may be placed on the platform while the extra capacity weight is inoperable. The invention contemplates other novel features which can best be brought out by a detailed description.

In the accompanying drawings:

Fig. 4 is a side elevation of a lever system.

Fig. 5 is an enlarged sectional detail on line 5—5 of Fig. 1 with some structural parts omitted for clarity in showing an inverted knife edge bearing.

Fig. 6 is an enlarged sectional view on line 6—6 of Fig. 1 showing certain of the details including the construction of the extra capacity weight.

Fig. 7 is a view looking into the upright portion of the scale showing the pendulum and manner in which the lever system is connected to the ribbon for actuating the pendulum.

Fig. 8 is a section taken on line 8—8 of Fig. 7, showing in detail the connection between the lever system and the ribbon.

Fig. 9 is a somewhat diagrammatic view showing the manner in which a target operates in conjunction with the scale mechanism to indicate whether or not the extra capacity weight is operative.

Figure 1:
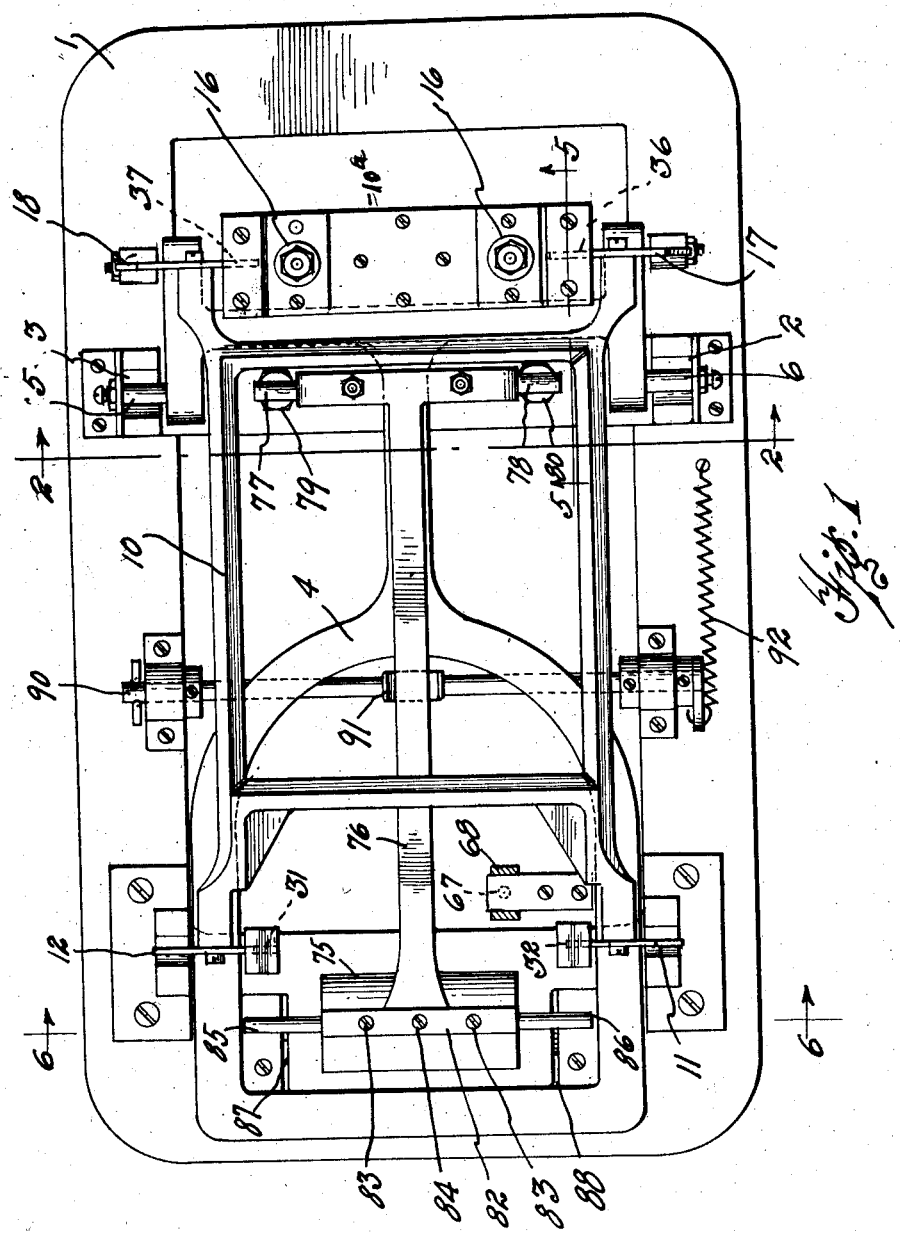
Fig. 1 is a top plan view of a lever system showing the levers mounted upon a suitable base, but with the cover for the levers and platform removed.

The lever system is mounted on a suitable support 1 (Figs. 1 and 4) which carries suitable agate bearings 2 and 3. A load lever 4 is provided with knife edges 5 and 7 which fit into the agate bearings. This load lever is a lever of the first order having one end 7 weighted to offset a load carried by the opposite end with the fulcrum point constituted by the knife edges and agate bearings disposed between its ends.

Above this main load lever is an arm 10 having knife edge bearings 11 and 12 resting in agate bearings which are carried by suitable uprights 13 which are in turn mounted on the base. The arm 10 is of a rigid frame construction (Fig. 1), and at one end carries posts 16, indirectly through pivotal bearings, and cross bar 10a for supporting, by means of suitable screw connection or otherwise, a load receiving platform 15 (Fig. 4).

This arm 10 is provided with knife edges 17 and 18, which rest in the agate bearings carried by upright links 19 and 20. The links also carry at their lower end, inverted agate bearings which rest upon knife edges 21 and 22 on one end of the load lever 4. In this manner the load on the platform is communicated through the posts directly through the links 19 and 20 to the main load lever. The lever being fulcrumed on its knife edges 6 and 7, the weighted end 7 of the lever is raised to balance the load. The links 19 and 20 are tied together to prevent them from slipping out of place by a suitable tie rod 23.

Figure 3:
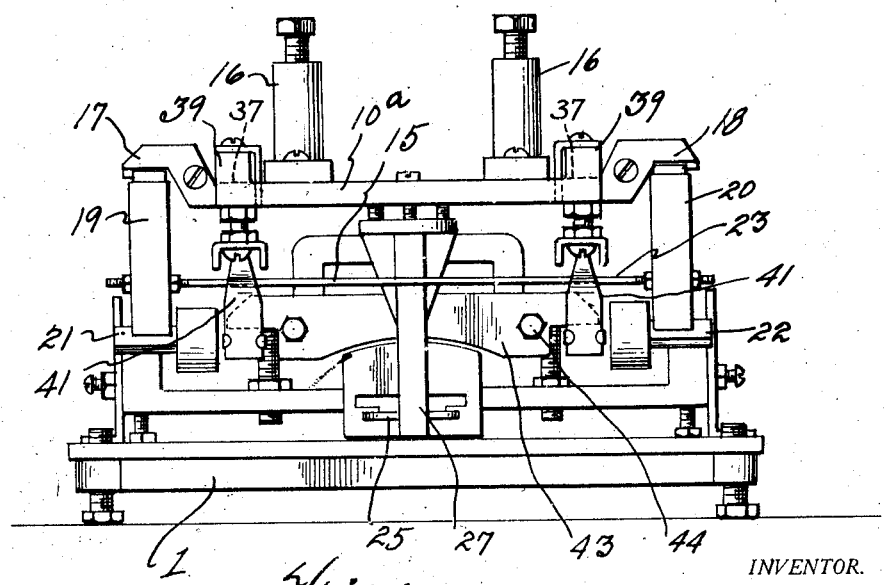
Fig. 3 is an end elevation of the lever system taken at the right hand side of Fig. 1.

There must be, however, some construction to hold the platform upright and prevent the same from tipping, together with the links 19 and 20. For this purpose an arm or check link 25 is connected by a knife edge bearing 26 to a member 27 which depends from the cross bar 10a (Figs. 3 and 4). The opposite end of this check link is connected to a fixed bracket 28 (Fig. 6) by a suitable knife edge bearing. This check link 25 in conjunction with the arm 10 acts as a pair of check links or parallel levers. In order to keep the knife edges 11 and 12 from climbing in the bearings, a double knife edge arrangement is provided as shown in Fig. 6. Knife edges 30 and 31 engage in inverted agate bearings carried by stirrups 32 and 33 which are in turn tied down to the base or support by links 34 and 35. The bearing connection between the check link 25 and bracket 28 is in alignment with the bearings 11 and 12 of the upper arm 10.

For the purpose of preventing the knife edges 17 and 18 from climbing in their respective agate bearings, a double knife edge arrangement is provided similar to the double knife edge arrangement just described. Opposing each knife edge 17 and 18 are upwardly extending knife edges 36 and 37 (Figs. 1 and 5). These knife edges engage inverted agate bearings 38 carried by suitable stirrups 39. These stirrups are pivotally connected as at 40 to links 41 which carry agate bearings 42. A cross bar 43 carries knife edges at its ends which engage in the agate bearings 42. This cross bar is mounted upon the main load lever 4 in such a manner that it can be adjusted to adjust the position of its knife edges. These knife edges, for perfect operation, must be in alignment with the knife edge bearings 21 and 22 of the main load lever. As shown in Fig. 5, the cross bar 43 is carried by machine screws 45 connected to the lever 4 and locked by lock nuts 46 and 47. It will readily be seen that by loosening the lock nuts 46 and 47 that the machine screws can be turned to adjust the position of the cross bar and then the lock nuts again tightened.

Interposed between the links 40 and stirrups 39 is a connecting member 50 carried by screws and lock nuts which makes an adjustment in the connection between these two members so that just the right amount of tension can be had with relation to the length of the upright links 19 and 20. In this manner the knife edges 17 and 18 are tied down and prevented from riding in their agate bearings.

Thus, the knife edges of the arm 10 are retained in their agate bearings, and the arm 10 and the link 25 operate as a pair of parallel levers or check links, and serve to hold the platform and the links 19 and 20 in an upright position. When a load is placed on the platform, or especially on one edge of the platform, so as to have a tendency to twist the arm 10 and raise one or the other of the knife edges 17 out of its bearing, the connection consisting of the links 40 and stirrups 39 becomes tough and retains the knife edges in the bearings.

As a load is placed upon the platform and communicated to the lever system through the posts 16, the weighted end of the lever is raised to counter balance this load. An indicator mechanism for indicating the weight of the load is shown in Fig. 7. The indicator mechanism shown is of the fan type having a pointer arm 60 which operates over a fan shaped chart (not shown). This arm is pivoted as at 61 and a pendulum weight 62 tends normally to move the indicator arm 60 across the chart. The extreme limits of such movement is determined by stops 63 and 64. The connection between the main load lever 4 and this indicator arm takes the form of the usual eccentric 65 over which a ribbon 66 operates (Figs. 7 and 8).

The main lever 4 is provided with a pin point bearing 67 which engages in a cooperating recessed bearing carried by a stirrup 68. The upper end of this stirrup is connected to the ribbon 66, as shown at 69. Mounted within this stirrup and fixed to a stationary part of the frame is a dash pot 70. A suitable plunger on a piston rod 71 operates in this dash pot and the rod is connected to the upper end of the stirrup.

This construction prevents buckling of the ribbon 66, and it will be understood that buckling of this ribbon which is of metal will cause, or is likely to cause, a bend therein which will materially interfere with the accuracy of the scale. When a large load is placed suddenly upon the platform of the scale, the pin point carried by the lever 4 raises suddenly, thus permitting the pendulum 62 to drop from the stop 63 to the stop 64. As shown in Fig. 7, the parts are in the position which they will take when the scale is taxed to its capacity. However, it is to be noted that the plunger in the dash pot and also the stirrup are suspended from the end of the ribbon so that when the pin point suddenly moves upwardly the dash pot allows a relatively slow movement of the pendulum 62. In other words, the pendulum 62 falls down by gravity against the action of the dash pot. Thus, although there is a sudden load placed on the platform, the indicating mechanism has a movement which is cushioned or controlled by the dash pot. The weight of the parts suspended from the ribbon together with the action of the dash pot at all times keeps the ribbon relatively taut. The pin point 67 will jump out of its cooperating bearing but will again find its position when the indicating mechanism relatively slowly moves under the action of the pendulum.

Figure 2:
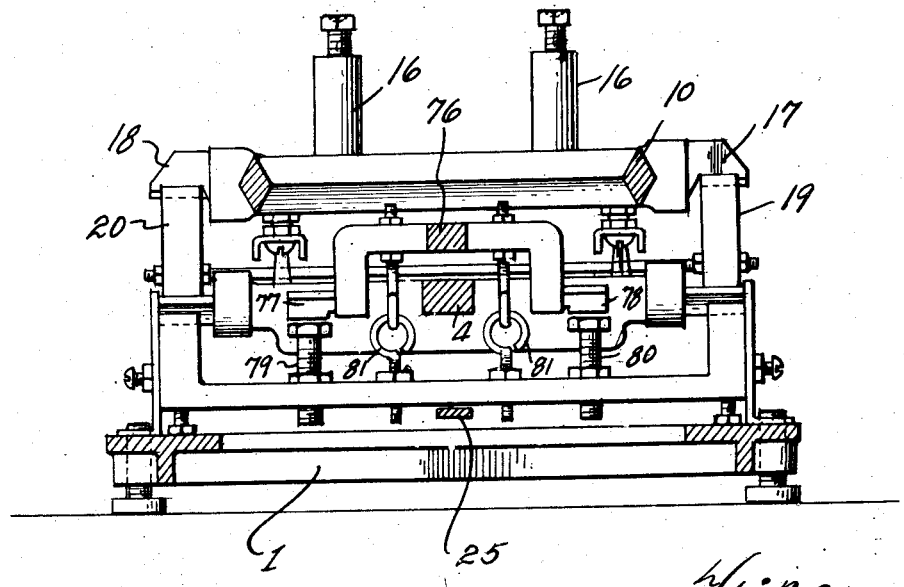
Fig. 2 is a sectional view taken on line 2—2 of Fig. 1 showing especially the manner in which one end of an arm carrying the extra capacity weight is mounted.

The extra capacity mechanism takes the form of a weight 75 carried by an arm 76 (Fig. 1). One end of the arm takes the shape shown in Fig. 2, and is provided with knife edge bearings 77 and 78. Cooperating with these bearings are adjustable screws 79 and 80 which have flat heads upon which the knife edges fulcrum when the extra capacity weight is in operation. The arm 76 is tied down by suitable link connections 81 (Fig. 2), the link connections being of sufficient length to permit the knife edges to raise from the heads of the screws when the extra capacity weight is out of operation.

The weight 75 (Fig. 6) is provided with an insert 82 which can be adjusted inwardly and outwardly respectively to vary and adjust the center of gravity of the weight. For this purpose there are screws 83 and a screw 84, the former extending through holes in the insert and threaded into the weight proper, and the latter being screw-threaded in the insert and abutting the weight proper. To move the insert upwardly, screws 83 are loosened and the screw 84 is tightened, and when the proper position is obtained the screws 83 are again tightened. A reverse operation moves the insert inwardly. The insert is provided with projections 85 and 86 which are adapted to be received in V-shaped bearings 87 and 88 carried by the main lever (Figs. 1 and 4). The weight can be dropped into the bearings to bring it into play, or it may be raised to bring it out of play. For this purpose a rock-shaft 90 is provided which carries a stirrup 91 which engages the arm 76. A suitable handle (not shown) may be provided which extends outside the cover for rocking the shaft. When the shaft is rocked so the stirrup is upright, the weight 75 is lifted, as shown in Fig. 4, and is inoperative. The weight is held in this position by a suitable spring 92 connected to a crank 93 fixed to the rock-shaft. When the stirrup 91 is rotated in a counter-clockwise direction, as viewed in Fig. 4, the weight 75 is lowered and the projections 85 and 86 drop into the V-shaped bearings carried by the main lever.

When the extra capacity weight is inoperative, as shown in Fig. 4, the weight 75 tends to move downwardly, and thus raises the opposite end of the arm 76. This lifts the bearings 77 and 78 (Fig. 2) from their seats provided by the screw heads. When the weight is dropped to bring it into play, the projections drop into the V-shaped bearings, and it will be seen that they will slide to the bottom of the V, and this positions the entire lever so that the knife edge bearings 77 and 78 are properly positioned on their flat cooperating bearing surfaces. The proper position is when the bearings 77 and 78 are in alignment with the fulcrum bearings of the main load lever, as shown in Fig. 1.

It is necessary, of course, that these knife edges engage the flat bearings with substantially equal pressure. Adjustment is provided for this. The adjustment can be made by a slight twisting or pivoting action given to the insert 82 (Fig. 6). To make an adjustment, one screw 83 may be loosened somewhat and the other somewhat tightened. This angular adjustment of the insert varies the position of the projections 85 and 86 with respect to their V-shaped bearings, so that the entire counter weight construction can be adjusted to bring the knife edges 77 and 78 into equal engagement with the bearings provided by the heads of the screws 79 and 80.

Having in mind a scale provided with an extra capacity weight, an arrangement which prevents buckling of the ribbon which operates over a cam is especially desirable. For example, this scale normally, without the extra weight, may have a capacity of ten pounds. A person may suddenly place a weight on the platform which is in excess of ten pounds; say, fifteen pounds, while the extra weight is held inoperable. This results in a quick upward movement of the weighted end of the load lever, inasmuch as it is not heavy enough to counter balance the load. The lower end of the ribbon, however, is not suddenly lifted, as the lever 4 merely moves upwardly and separates the pin point bearing, while the weight of the stirrup and the dash pot plunger, suspended from the end of the ribbon, keeps the ribbon relatively taut so that there is no danger of buckling the ribbon.

It is desirable to indicate to a purchaser whether or not the excess capacity weight is being used by the scale, and indeed, in many localities this is required by law. Accordingly, the invention contemplates a target which is operative in accordance with the movements of the extra capacity mechanism to indicate whether or not the weight is in use.

This target may take the form of a suitably shaped casing 90 which is fixed to the scale housing, as at 91, having a housing 92 and an elongated portion 93. A shaft 94 carries at one end a plate-like member 95 which is provided with indicia visible through an opening 95a. The lower end of the rod 94 may be provided with an adjustable block 96. The rod and the plate are slidable with respect to the housing, and the adjustable member 96 contacts with the extra-capacity weight when the weight is in raised position, or in other words, inoperative. When the weight is raised the slide 95 is raised so that the proper character is visible through the opening 95, which in the present instance is naught. When the extra-capacity weight is dropped onto the scale levers, the rod 94 and the plate 95 are permitted to drop.

However, these target parts do not move down so far as the extra-capacity weight for the purpose of freeing the weight and spacing the weight and the target member far enough apart to permit full capacity by operation of the levers without interference of the target. For this purpose the plate may contact with the housing, as at 97, shown in Fig. 9. In this position the levers and the weight are free from the target and the target assumes a position so that the proper indicia is visible at the opening 95, which in the present instance is the numeral 10.

Claims:

1. In a scale, a lever system comprising a main load lever of the first order, bearings near one end of the lever for receiving the load, the other end of the lever being arranged to counterbalance the load, load platform supporting means carried by said bearings, and a pair of spaced arms constituting check links pivotally connected to the platform supporting means and extending in the same direction as the main load lever and being pivotally mounted adjacent the counterbalancing end of the main load lever.

2. In a scale, a lever system comprising a main load lever of the first order, upright links carried by one end of the lever, a load supporting means resting upon the upper ends of the links, the opposite end of the main load lever being associated with weight indicating means, an arm pivotally connected to the load supporting means at a point near the top of the said links, a second arm pivotally connected to the load supporting means at a point near the top of the said links, a second arm pivotally connected to the load supporting means at a point below the said links, said arms being parallel and extending in the direction of the load lever and being pivotally mounted at their ends near the opposite end of the main lever to act as parallel levers or check links.

3. In a scale, a lever system consisting of a main load lever of the first order, upright links supported by one end of the lever, load platform supporting means resting upon the upper ends of the links, said load platform supporting means having a part which projects downwardly below the main load lever, a pair of arms, each pivotally connected to the platform supporting means, one arm being so connected at a point above the main load lever and adjacent the tops of the links, and the other arm being positioned below the main load lever, said arms both extending toward the counterbalancing end of the main load lever and having their ends near the counterbalancing end of the main load lever pivotally mounted to act as parallel arms or check links.

4. In a scale, a lever system and load supporting mechanism comprising a load lever, upstanding links carried by the load lever provided with agate bearings, means for receiving the load having knife edge bearings fitting in the agate bearings of the upstanding links, check links for holding the load supporting mechanism in proper vertical position and for holding the said links upright, and tension links connecting the main load lever with a load supporting means and acting in opposition to the upright links to prevent the said knife edges from riding in the agate bearings, and an adjustable member carried by the main load lever for pivotal connection with the said tension links, said member being adjustable to properly position the said links with respect to the main load lever.

5. In a scale, a lever system and load supporting mechanism comprising a load lever, upstanding links carried by the load lever provided with agate bearings, means for receiving the load having knife edge bearings fitting in the agate bearings of the upstanding links, check links for holding the load supporting mechanism in proper vertical position and for holding the said links upright, and tension links connecting the main load lever with the load supporting means and acting in oppositon to the upright links to prevent the said knife edges from riding in the agate bearings, and an adjustable member carried by the main load lever for pivotal connection with the said tension links, said member being adjustable to properly position the said links with the main load lever, and the said tension links having members which are adjustable to vary the length of the links.

6. In a scale, a lever system and load supporting mechanism comprising a load lever, upstanding links carried by the load lever provided with agate bearings, means for receiving the load having knife edges bearings fitting in the agate edge bearings of the upstanding links, check links for holding the load supporting mechanism in proper vertical position and for holding the said links upright, and tension links connecting the main load lever with a load supporting means and acting in oppositon to the upright links to prevent the said knife edges from riding in the agate bearings, said tension links each consisting of two members pivotally connected together and adjustable with relation to each other to vary the length of said links.

7. In an extra-capacity scale, the combination of a lever system including a lever movable on a fulcrum in response to a load, an extra-capacity weight mechanism including an arm having a weight at one end and a knife edge at its opposite end, a bearing member adjacent the weight, a V-shaped bearing on said load lever, means for raising and lowering the weighted arm to bring the extra-capacity weight out of or into operating position, respectively, with the bearing member adjacent the weight in the V-shaped bearing when the extra-capacity weight is in operative position, and a substantially flat bearing member for the said knife edge on the extra-capacity arm, upon which said knife edge is properly positioned when the said bearing member adjacent the weight drops into the V-shaped bearing on the main load lever.

8. In an extra-capacity scale, the combination of a lever system including a main load lever, an arm having a weight at one end, means for raising and lowering the arm to place the weight on a main load lever or to remove it therefrom, cooperating means on the main load lever and adjacent the weight which automatically positions the said weight and arm when the weight is placed on the main load lever, a knife edge bearing at the opposite end of the weight carrying lever, and a substantially flat bearing therefor whereby the knife edge is properly positioned on its flat bearing when the weight is placed on the main load lever.

9. A weight for an extra-capacity scale, comprising a weighted body adapted to be brought into and out of operative position with respect to the scale mechanism, said weighted body having a groove therein, an insert in the groove, an adjustable screw threaded into the insert and abutting against the body, said insert having apertures therethrough one disposed on each side of the screw, other screws extending through the apertures and threaded into the weighted body whereby the position of the insert can be varied to adjust the center of the gravity of the extra-capacity weight.

10. In a scale, the combination of a lever system, an extra-capacity mechanism consisting of an arm adapted to be moved into and out of operative position with respect to the lever system, a pair of spaced bearings at one end of the arm, and bearing members therefor, a member adjacent the opposite end of the arm provided with projecting bearing members for engagement with one of the levers in the system when in operative position, said member being adjustable with respect to the said arm to change the relative position of the projecting bearings so that when the projecting bearings contact with the said lever the arm is positioned so that the spaced bearings at the opposite end contact substantially equally with their respective bearings.

11. In a scale, the combination of a lever system, an extra-capacity arm which is weighted and which is adapted to be brought into and out of operative position with respect to the lever system, spaced bearings operating on fixed supports at one end of the arm, spaced bearings adapted to contact with a lever in the lever system at the opposite end of the arm, said last mentioned bearings being adjustable vertically with respect to each other whereby these bearings when in contact with the lever position the arm so that the first mentioned bearings contact substantially equally with their respective supports.

12. In a scale, the combination of a lever system, an extra-capacity arm which is weighted and which is adapted to be brought into and out of operative position with respect to the lever system, spaced bearings operating on fixed supports at one end of the arm, the opposite end of the arm being provided with a transversely extending member provided with oppositely projecting members adapted to contact with a lever in the lever system, this transverse member being pivotally adjustable in a substantially vertical plane to raise or lower the projecting members with respect to each other whereby when the projecting members contact with the lever the arm is positioned so that the bearings at the opposite end contact substantially equally with their respective supports.

13. In a scale, the combination of a lever system, an arm carrying a weight adjacent one end adapted to be brought into and out of operating relation with the lever system to change the capacity of the scale, said weight including a transversely extending insert provided with projecting bearing members for making contact with a lever in the lever system, said transversely extending member being adjustable inwardly and outwardly with respect to the weight to adjust the center of gravity thereof, and said transversely extending member being pivotally adjustable with respect to the weight to vary the position of the projecting bearing members with respect to each other.

14. In a scale, the combination of a lever system indicating mechanism of the type employing a pendulum adapted to descend under load, a ribbon operating over an eccentric which is controlled by the pendulum with the ribbon operatively associated with the lever system, a dash pot in fixed position, and a plunger in the dash pot which is suspended from the ribbon whereby upon sudden actuation of the lever system the said ribbon is retained taut by the plunger and prevented from buckling.

15. In a scale, the combination of a lever system, an indicating mechanism of the type employing a pendulum controlled by a ribbon operating over an eccentric, a dash pot, a plunger for the dash pot which is suspended from the ribbon, and a connection between the lever system and the ribbon which permits the pendulum to actuate when a load is placed on a lever system, said connection being such as to tend to break upon sudden actuation of the lever system and restrict a relatively slow movement of the indicating mechanism whereby the weight of the dash pot plunger suspended from the ribbon prevents buckling of the ribbon.

16. In a scale, the combination of a lever system, an indicating mechanism of the type employing a pendulum controlled by a ribbon operating over an eccentric, a stirrup connected to the lower end of the ribbon, said stirrup being connected to the lever system, a dash pot positioned within the stirrup, and a plunger for the dash pot which is suspended from the ribbon.

17. In a scale, the combination of a lever system, an indicating mechanism of the type employing a pendulum controlled by a ribbon operating over an eccentric, a stirrup connected to the lower end of the ribbon, said stirrup being connected to the lever system, a dash pot positioned within the stirrup, and a plunger for the dash pot which is suspended from the ribbon, the connection between the stirrup and the lever system consisting of a pin-point connection arranged so that the connection tends to separate upon sudden actuation of the lever system whereby upon such sudden actuation the weight of the dash pot plunger and the stirrup suspended from the ribbon keeps said ribbon taut and prevents buckling thereof.

18. In a scale, the combination of a lever system, an indicating mechanism of the type employing a pendulum controlled by a ribbon operating over an eccentric, a stirrup connected to the lower end of the ribbon, a pin-point connected between the lower end of the stirrup and the lever system, a fixedly mounted dash pot within the stirrup, and the dash pot plunger suspended from the ribbon the weight of which acts to keep the ribbon taut and prevent buckling thereof to prevent sudden actuation of the lever system.

19. In a scale, the combination of a scale housing provided with a transparent portion, scale levers, an extra-capacity weight movable to and from operative position with respect to the scale levers, a target having a portion positioned to the rear of the transparent portion of the housing, said target having a portion which contacts with and which is moved by the extra-capacity weight when the same is in inoperative position, indicia on the target for indicating the position of the extra-capacity weight, said target being arranged to move to another position when the extra-capacity weight is in operative position, means for spacing the target and the weight in this position to permit accurate operation of the scale, and indicia on the target for indicating this position of the extra-capacity weight.

20. In an extra capacity scale, the combination of a scale lever system, an extra capacity weight, means for supporting this weight independent of the lever system to permit operation of the lever system free of said weight, means for moving said weight into an operative engagement with the lever system, an insert member in this weight, and means for adjustably holding the insert in the weight to permit adjustment of the insert member to adjust the center of gravity of said weight.

21. In an extra capacity scale, the combination of a scale lever system, an extra capacity weight, means for supporting this weight independent of the lever system to permit operation of the lever system free of said weight, means for moving said weight into an operative engagement with the lever system, said weight including a body provided with a groove, an insert in this groove, and an adjustable means for holding this insert in the groove which permits variation in the position of the insert to vary the center of gravity of the weight.

In testimony whereof I affix my signature.

BERT W. KING.